Dec. 4, 1945.　　　P. E. MERCIER　　　2,390,161
AIRPLANE POWER PLANT
Filed Nov. 7, 1941　　　3 Sheets-Sheet 2
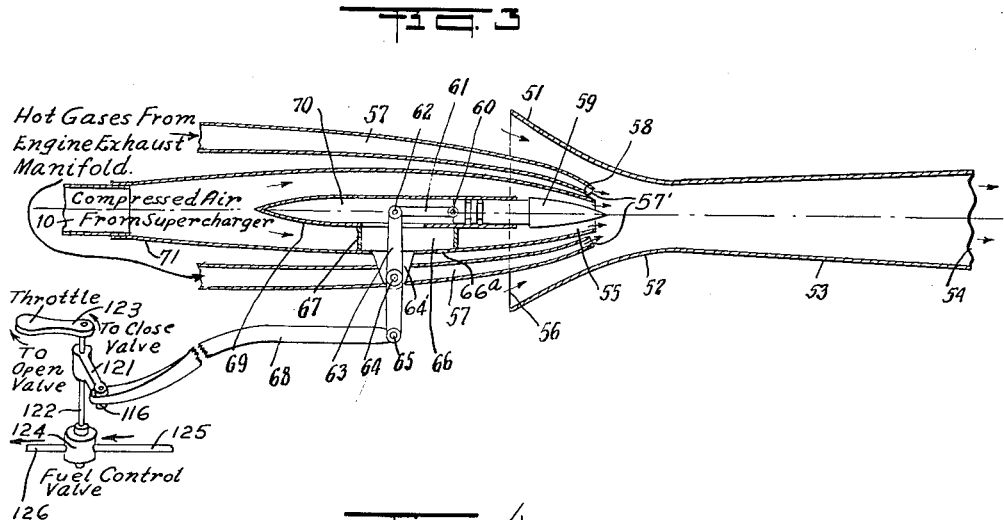
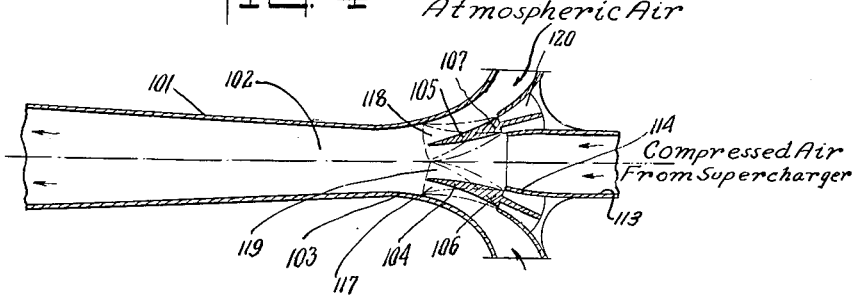
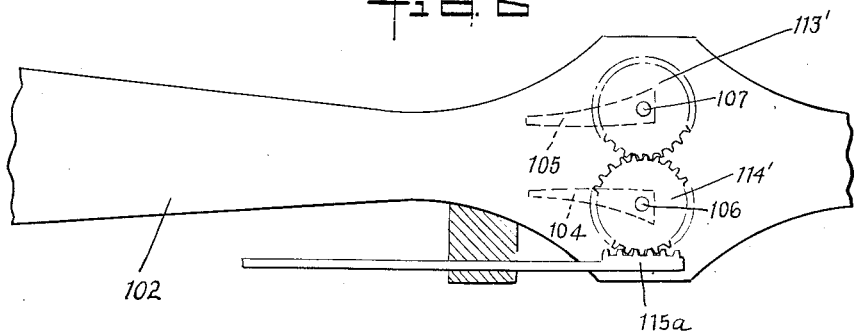
INVENTOR.
*Pierre Ernest Mercier*
BY *Haseltine, Lake & Co.*
ATTORNEYS Dec. 4, 1945.  P. E. MERCIER  2,390,161
AIRPLANE POWER PLANT
Filed Nov. 7, 1941  3 Sheets-Sheet 3
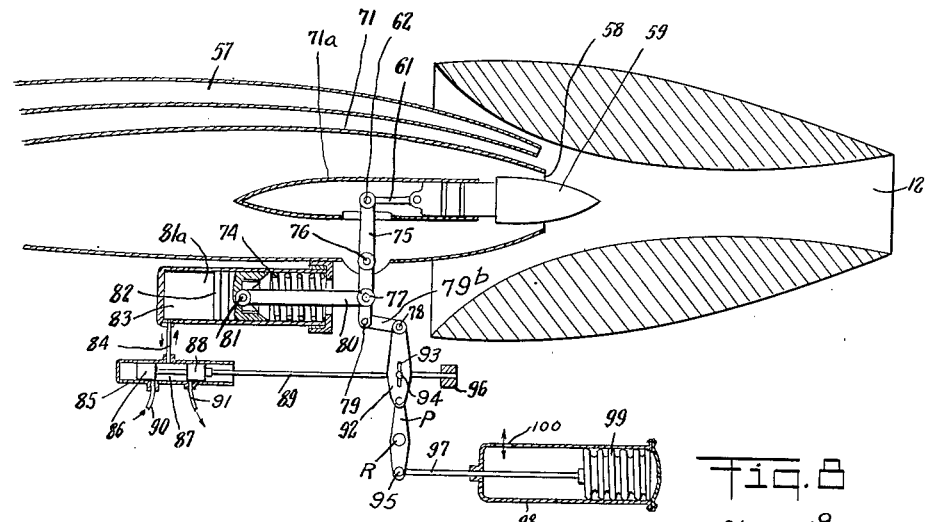
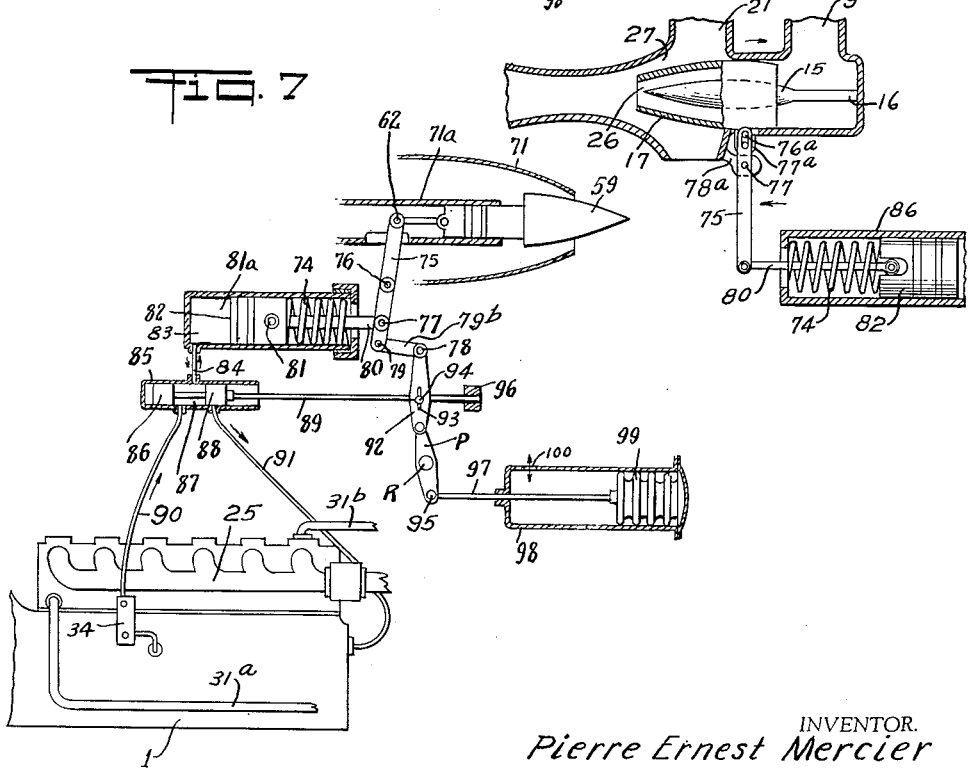
INVENTOR.
Pierre Ernest Mercier
BY Haseltine, Lake & Co.
ATTORNEYS Patented Dec. 4, 1945

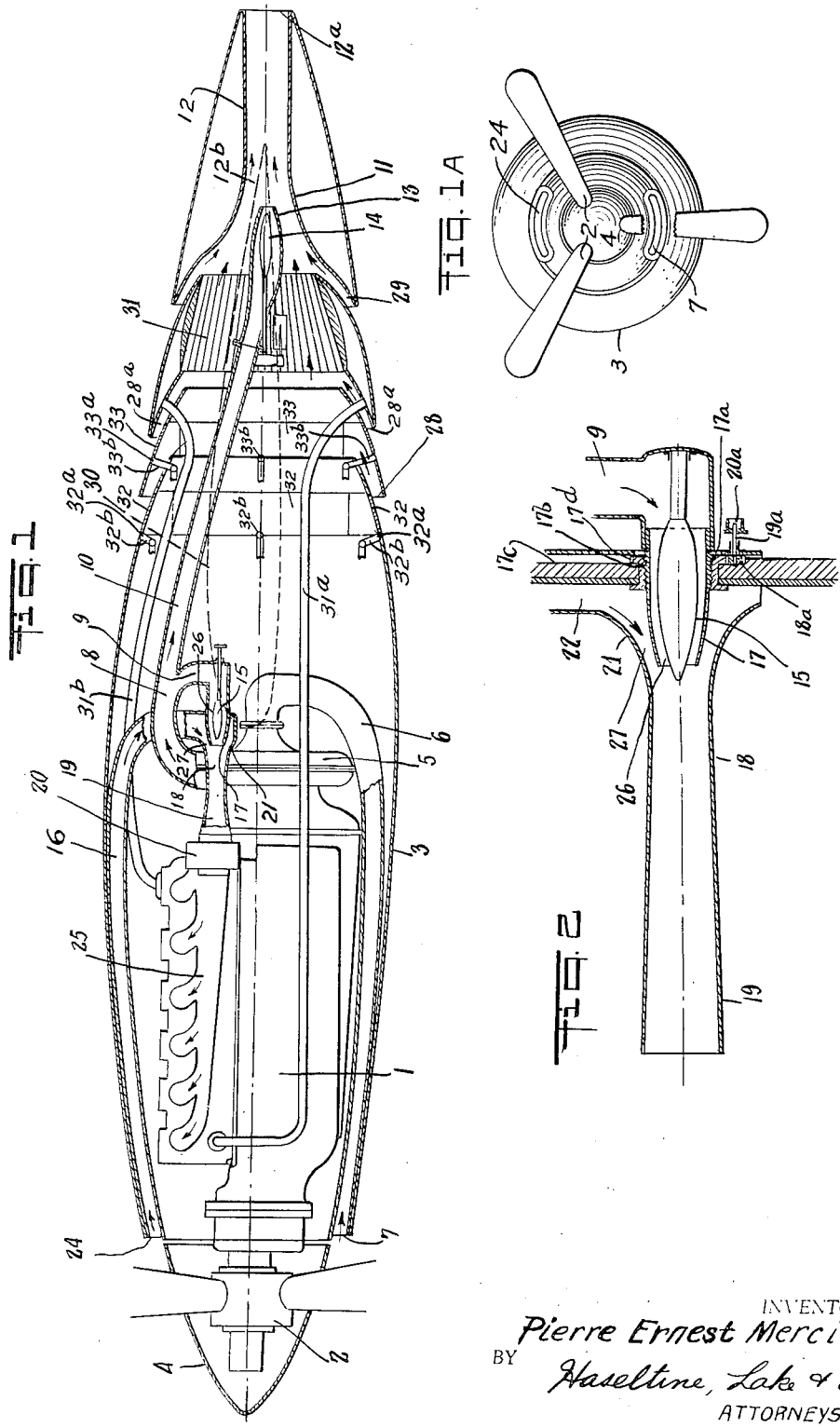

2,390,161

UNITED STATES PATENT OFFICE 2,390,161

AIRPLANE POWER PLANT

Pierre Ernest Mercier, Westport, Conn.

Application November 7, 1941, Serial No. 418,112

14 Claims. (Cl. 60—35.6)

This invention relates to improvements in aircraft, and particularly to power plants for use in airplanes, aerostats and similar types of aircraft that are capable of operation at very high altitudes.

Airplanes, especially those of certain types used for military purposes, have come to operate at great altitudes, sometimes more than five miles above sea level. Due to the thinning of the air at high altitudes an airplane engine will obtain less oxygen at each induction stroke unless special means are employed, such as superchargers, for compressing the air drawn in from the surrounding atmosphere or otherwise providing sufficient oxygen to maintain combustion of the weight of fuel required for satisfactory operation.

Adequacy of power for an airplane flying at high altitudes cannot be predicated upon ground performance. In order to increase and maintain the power efficiency of aircraft power plants at high altitudes, it is necessary to increase the compression ratio of the supercharger sufficiently to insure that the amount of oxygen supplied in the compressed air will be sufficient to maintain combustion of the fuel supplied thereto; otherwise, there is a resultant loss of power output as the weight of fuel consumed is correspondingly reduced because of the insufficiency of oxygen.

In employing superchargers to supply compressed air to airplane engines operating at varying high altitudes, it has been customary to maintain the desired compression of the air supplied to the engine either by varying the rate at which the supercharger is driven by means of suitable gear changing devices or by otherwise regulating the output of the supercharger. Such arrangements require attention on the part of the pilot and also do not as a practical matter permit of precise variations in the rate of drive of the supercharger corresponding to changes in the altitude of the plane and the consequent changes in the air pressure. Furthermore, superchargers usually have a certain optimum output which varies according to design but is usually adjusted to approximate the maximum requirements of compressed air from the supercharger. Any substantial change in the rate of drive of the supercharger from the optimum output range leads to lessened efficiency and loss of available power.

It is an object of my invention to provide an air supply system for an airplane engine adapted for operation at high altitudes whereby air is supplied to the air intake of the engine under a constant and adequate pressure irrespective of the pressure conditions obtaining in the surrounding atmosphere.

It is a further object of my invention to provide, in association with a supercharger operable in the manner above indicated, means whereby air compressed in the supercharger is mixed with air drawn in from the surrounding atmosphere and then supplied to the engine for combustion purposes, any remainder of the output of the supercharger being directed to a rear propulsive nozzle.

It is a still further object of the invention to provide means whereby the proportion of compressed air supplied to the engine is automatically varied in response to variations in the pressure of the ambient air.

It is still another object of the invention to provide means whereby the proportion of compressed air supplied to the rear propulsive nozzle is automatically varied in response to variations in the pressure of the ambient air.

It is another object of the invention to provide means whereby the flow of compressed air to the engine air intake pipe and to a rear propulsive nozzle is varied automatically in response to variations in the rate of feed of fuel to the engine to the end that the supply of compressed air to the engine is increased proportionately with increase in the rate of fuel supply, and vice versa, with corresponding reduction, or increase as the case may be, in the amount of compressed air diverted to the rear propulsive nozzle or other propulsive unit.

A further feature of the invention resides in the arrangements and dispositions of the air intake and distribution conduits so as to obtain an improved streamlined effect and thereby minimize resistance to flow as well as to facilitate adjustments for controlling the pressure in the air intake of the engine.

It is a further advantageous and important feature of my invention to provide an air induction, air compression, and air distribution system for an airplane power plant which permits the airplane to attain great speed at high altitudes without suffering any diminution of the pressure of the air supplied to the air intake of the engine, but which is operable when the airplane is flying below such critical altitudes to divert that part of the compressed air in excess of the current operating requirements of the engine into and through a rear propulsive nozzle or other propulsive unit with the result that the compressed air so diverted yields up energy in imparting a forward thrust to the plane.

A further and advantageous feature of my invention consists in the provision of dual control means for regulating and controlling the supply of atmospheric air as well as the supply of compressed air in varying proportions according to the altitude at which the aircraft is travelling.

With the above and other objects in view, my invention includes the combinations, arrangements, and features disclosed in the drawings and specification and more particularly pointed out in the appended claims.

In the drawings:

Fig. 1 is a vertical longitudinal section, with parts in side elevation, of an engine power plant and enclosing nacelle and fairing which includes one embodiment of the air induction compression, and distribution system of my invention in association with a rear propulsive nozzle;

Fig. 1A is an end elevation of the power plant and engine nacelle of Fig. 1 viewed from the left side of Fig. 1 looking to the right;

Fig. 2 is a longitudinal vertical section of a modified form of the mixing chamber for atmospheric air and compressed air shown in Fig. 1 with details of an adjustable valve for regulating the flow of compressed air thereto;

Fig. 3 is a fragmentary view, partly in longitudinal vertical section and partly in side elevation, of a modification of the rear propulsive nozzle wherein means is provided for leading combustion gases from the exhaust manifold of the engine to a mixing chamber and using their energy as well as that of the compressed air in obtaining the propulsive effect;

Fig. 4 is a horizontal sectional view of a further modification of the air mixing means for supplying air of regulated pressure and volume to the engine carburetor;

Fig. 5 is a longitudinal sectional view with parts in side elevation of a modification of the rear propulsive nozzle and associated compressed air and exhaust gas discharge nozzles showing also a mechanism for automatically controlling the feeding of compressed air to the propulsive nozzle in response to variations in the pressure of the ambient atmosphere;

Fig. 6 is a fragmentary side elevation of the air mixing means of Fig. 4, showing an actuating means for the damper controls thereof;

Fig. 7 is a diagrammatic view of certain of the parts of Fig. 5 in a different stage of operation;

Fig. 8 is a part vertical section, part side elevation of a further modification of the air mixing chamber of Fig. 2.

In the drawings, in which Fig. 1 illustrates an advantageous mode of applying the invention, the engine 1 is mounted within the nacelle 3 and drives the propeller 2 with which is associated the usual spinner 4. An air compressor 5 is located at the rear of the engine, being driven thereby in a conventional manner. The compressor 5 is supplied with outside atmospheric air through an elongated conduit 6 which extends lengthwise of the engine 1 and has an inlet opening forwardly as at 7 in a plane with the base of the spinner 4. The pressure pipe 8 of the compressor is divided into a short branch 9 which communicates with the induction pipe 19 and a longer branch 10 which extends rearwardly discharging into the jet propulsive nozzle 12.

As shown in Fig. 1, the induction pipe 19 is flared outwardly as at 21 adjacent the point of connection therewith of the atmospheric air conduit 16 to facilitate mixing of atmospheric air entering through the conduit 16 with the compressed air injected through the nozzle 17 formed as a continuation of the branch conduit 9. Flow of compressed air through the nozzle 17 is regulated by the streamlined valve member 15 positioned concentrically within the nozzle 17 and shown in Fig. 1 as adjustable lengthwise of the nozzle 17 to vary the effective cross-section of the annular passage 26.

The atmospheric air conduit 16 is shown as extending lengthwise of the engine in similar manner as conduit 6 and as having an air inlet opening at 24 adjacent the base of the propeller spinner opposite the inlet opening 7 of the conduit 6. The conduit 16 curves inwardly at its rear end and connects with the outwardly flaring end 21 of the induction pipe 19. The outwardly flaring end of the pipe 19 and the nozzle 17 define between them an annular passage 27 through which the atmospheric air passes into the induction pipe 19 and there mingles with the compressed air received from the branch pipe 9.

As shown in Fig. 1, the induction pipe 19 is restricted in diameter intermediate its ends, thus forming a Venturi throat which promotes the mixing of the atmospheric air and compressed air and facilitates the feeding of the mixture to the engine carburetor 20 and thence to the engine intake manifold 25. Since the air entering through the nozzle 17 is in a highly compressed state and travelling at a relatively high velocity as compared with the entering atmospheric air, it will tend to accelerate the flow of atmospheric air through the conduit 16 into the mixing chamber, thus increasing the amount of atmospheric air that is intermixed with the compressed air and fed to the engine.

As shown in the modification of Fig. 2, the nozzle 17 is formed with screw threads 17a engaging internal screw threads of a ring 17b supported by the panel 17c. The nozzle 17 is shown as having a sliding fit with the end of the branch pipe 9. The ring 17b carries a gear 17d which meshes with a pinion 18a mounted on a shaft 19a. A pulley 20a is also mounted on the shaft 19a and is driven by a belt or similar means (not shown) leading to a sheave rotated by the pilot when he desires to adjust the flow of compressed air through the nozzle 17. It will be apparent that when the pulley 20a is turned in either direction the gear 17d will turn in unison, thereby rotating the ring 17b and advancing or retracting the nozzle 17 relatively to the member 15 with consequent change in the cross-sectional area of the annular passage 26.

It will be seen from the above that the mixture conveyed through the induction pipe 19 to the carburetor 20 is composed of a ratioed quantity of outside air and compressed air. When the nozzle or sleeve 17 is moved to the left as viewed in Fig. 2, it contracts the cross-section of the annular passage 27, thus restricting entrance of outside air into the induction pipe 19. At the same time, however, the same conical end of the nozzle 17 enlarges the cross-sectional area of the annular passage 26, thus increasing the quantity of compressed air passing through the passage 26 into the induction pipe 19. According to this arrangement, the flow of outside air into the induction pipe 19 is regulated inversely to the flow of compressed air, and vice versa.

As previously indicated, the efficiency of a compressor varies directly with its output. Therefore, when the aircraft is travelling at altitudes lower than those where it is usually desirable to utilize all or a large part of the output of the compressor in feeding air to the engine, the position of the nozzle 17 will be adjusted to the right, as shown in Figs. 2 and 8, thus enlarging the annular passage 27 and admitting a larger flow of atmospheric air to the engine, at the same time causing a larger proportion of the compressed air to pass to the jet propulsion nozzle.

It will be noted that the induction pipe 19 is in axial alignment with the carburetor and the engine intake manifold and that it is fed with air in a direction parallel with the annular compressed air and atmospheric air inlet orifices 26 and 27, thereby facilitating the flow of air to the engine and minimizing back pressure and loss of energy of the air in the course of its travel to the engine.

As shown in Fig. 1, the compressed air passing through the branch conduit 10 is discharged through the nozzle 13 into the mixing zone 12b immediately in advance of the restricted throat 11 of the propulsive nozzle 12. Flow of compressed air through the nozzle 13 is controlled by the valve 14 which is movable lengthwise of the nozzle 13. A plurality of annularly arranged slots 28, 28a and 29 are provided in the fairing of the nacelle in spaced relation in advance of the mixing zone 12b. The discharge of compressed air, or compressed air and exhaust gases within the modifications of Figs. 3 and 5, into the mixing zone 12b causes air to be sucked in from the atmosphere through the slots 28, 28a and 29 and to be discharged in admixture with the compressed air, or compressed air and exhaust gases, through the propulsive nozzle. By drawing atmospheric air through the annularly arranged slots there is effected a reduction of the drag upon the nacelle surfaces that is normally exerted by the boundary layer of air. In addition, the intermingling of the induced flow of atmospheric air with the compressed air and exhaust gases brings about an interchange of heat from the heated gases to the atmospheric air that is beneficial in increasing the useful work performed by the ejected gases.

By providing suitable heat exchange surfaces, which may take the form of a radiator 31, and disposing the radiator in the line of flow of air from the slots, or certain of them, to the mixing zone, the induced flow of atmospheric air may be used to cool the engine or parts thereof through heat interchange between the air and a cooling liquid maintained in a closed circulation between the engine and the radiator 31 by suitable piping 31a and 31b. The heat absorbed from the cooling liquid by the air passing through the radiator is beneficially utilized in increasing the propulsive action of the rear nozzle 12.

If it is desired to adjust or vary the flow of air passing through the radiator 31 this can be effected by varying the effective cross-sectional areas of the successive slots 28 and 28a by suitable closure flaps, or equivalent means, as for example, by the flaps 32 and 33 which may be swung outwardly about their pivots 32a and 33a by suitable means, as for example the lever arms 32b and 33b.

As previously stated, the valve 14 is movable axially of the nozzle 13, thus permitting selective control to be had of the flow of compressed air supplied to the rear propulsive nozzle 12. The valve 14 may be moved manually by the pilot or automatically in response to variations in the atmospheric pressure.

In Fig. 3 I have shown a modification of the rear propulsive nozzle and the connections thereto whereby exhaust gases from the engine are directed to and through the rear propulsive nozzle and cooperate with the compressed air diverted from the supercharger to accelerate the inflow of air through slots in the walls of the engine nacelle or other enclosing structure, not shown in Fig. 3, but which may, for example, take the form of the slots 28, 28a and 29 of Fig. 1.

In addition to the increased air entraining effect produced by passing engine exhaust gases to and through the rear propulsive nozzle, it will be understood that heat energy of these exhaust gases is in part given up to the entrained air and usefully employed in increasing the propulsive effect of the mixture of gases discharged through the rear propulsive nozzle.

Referring more particularly to Fig. 3, the propulsive nozzle 53 is shown as taking a somewhat different specific form as compared with the nozzle 12 of Fig. 1, but it likewise has a restricted throat portion 52, an outwardly flaring portion 51 and a rearwardly extending gradually outwardly flaring portion 54. As shown in Fig. 3, the dispositions for injection of compressed air and engine exhaust gases include a pair of exhaust gas conduits 57 leading from the engine offtake manifold not shown, and disposed on opposite sides of a centrally disposed compressed air receiving chamber 71 provided with a discharge nozzle 58. As shown, the conduits 57 are curved inwardly toward the discharge nozzle 58 and terminate in nozzles 57' adjacent the nozzle 58. Arranged concentrically within the chamber 71 is a hollow casing 70 fixedly secured to the hollow support member 67. Slidably mounted in the casing 70 in line with and projecting into the nozzle 58 is a conical valve member 59. This member is connected at 60 to a link 61 which in turn is pivotally connected at 62 to the lever 63. The lever 63 is pivotally attached at 64 to a bracket 64'. The opposite end of the lever 63 is pivotally connected at 65 to a rod or link 68 or equivalent connecting means leading to the pilot's control cabin, or to automatic control means such as shown in Figs. 5 and 7, when automatic control in response to varying air pressures is to be maintained.

The hollow member 67 is streamlined to minimize interference with the flow of compressed air past the same to the nozzle 58 and is open to the atmosphere at 66a thereby permitting equalization of the pressure within its cavity 66 with the pressure of the surrounding air. The lever 63 swings freely in the space 66 defined by the member 67, and as it is swung in one direction or another the valve 59 is advanced or retracted accordingly to cause the annular discharge passage 55 from the chamber 71 to be narrowed or enlarged to restrict or increase the volume of compressed air discharged through the nozzle 58 as desired.

As shown in Fig. 3 the valve 59 may be operated simultaneously with and in direct relation to the operation of the gas control lever. In this modification the lever 63 will be connected for reciprocation directly with the gas control lever 123, as for example by pivotal connection at 116 with an arm 121 carried by the shaft 122 which is rotatable with the gas control lever 123 to operate a valve 124 disposed in the gasoline feed line 125—126. As shown, when the gas control lever 123 is turned clockwise in opening the valve 124, the valve 59 is moved to the right to further restrict the flow of compressed air through the nozzle 58, at the same time causing the proportion of compressed air passing through the branch pipe 9 (Fig. 1) to increase.

In Figs. 5 and 7 I have disclosed one arrangement for controlling the feeding of the compressed air to the engine and to the rear propulsive nozzle whereby the regulation of the distribution of the compressed air as between the engine and the rear propulsive nozzle is automatically controlled in accordance with variations in the atmospheric pressure due to changes in the altitude of the airplane in flight.

Reference being made to Fig. 5, the propulsive nozzle 12 is shown in association with a compressed air discharge chamber 71 and an exhaust gas discharge conduit 57 similarly arranged as in Fig. 3. Discharge of compressed air from the chamber 71 is automatically controlled by the valve 59 connected by the link 61 at 62 to one arm of the lever 75 which moves about the fixed pivot 76. The lever 75 is pivotally connected at 77 to to the link 80 which is connected at 81 to the piston 82 that reciprocates in the cylinder 81a in response to changes in atmospheric pressure due to changes in the altitude of flight. The arrangements that make this possible include a rod 89 carrying a pair of spaced-apart valve pistons 86 and 88 closely fitting within cylinder 85 connected to the cylinder 81a by a pipe 84. The cylinder 85 is provided with fluid connections 90 and 91 establishing communication with the oil circulating system of the engine (see Fig. 7), or another dependable source of fluid supply. The rod 89 is slidably supported at its outer end in a bearing 96. The piston valves 86 and 88 are so spaced as to establish communication either with the inlet conduit 90 or the outlet conduit 91 of the oil circulating system depending upon their positions within the cylinder as determined by the movements of the rod 89. The piston valves may be also serve to close off access to both conduits 90 and 91 when intermediate positions are assumed after adjustment for a change in the altitude at which the plane is being operated. The rod 89 carries a pin 94 establishing a pin and slot connection with the slotted opening 93 in a push and pull lever 92 having its upper end pivotally connected at 78 to a link 79b which in turn is pivotally connected to the lower end of the lever 75 at 79. At its lower end the lever 92 is pivotally secured to the upper end of a cooperating push and pull lever P pivotally supported at R and having its opposite end connected at 95 to a rod 97 attached to one end of a bellows 99 positioned for alternate contraction and expansion lengthwise within an elongated casing 98. The casing 98 has an opening 100 at one end thereof establishing free communication with the atmosphere.

As shown in Fig. 5, the parts are set for operation of the engine and aircraft under atmospheric pressure conditions somewhat less than obtain normally at sea level, say, at an intermediate altitude within the normal altitude range of the airplane. The bellows 99 has assumed a partially collapsed or contracted position and the pistons 86 and 88 carried by the rod 89 have been moved to an intermediate position where communication to and from the conduits 90 and 91 has been cut off.

In Fig. 7 the bellows is shown as still further collapsed and in the position assumed when the aircraft is being operated under normal atmospheric pressure conditions. The lower end of the lever P has been carried to the right causing the upper end to move to the left about the pivot R and carry with it the adjacent end of the lever 92 and the rod 89, and thus establishing communication between the space 87 and the inlet conduit 90. Upon movement of the piston 86 to the left sufficiently to permit flow through the inlet pipe 90, the piston 82 will tend to be urged to the right because of the increase in pressure set up in the chamber 83. At the same time the lower end of the lever 75 will be carried to the right, thereby moving the valve 59 to the left and increasing the size of the discharging orifice for compressed air. Due to the link connection 79b the upper end of the push and pull lever 92 will also be carried to the right and through the pin connection 93 will move the rod 89 and the pistons 86, 88 to the right until the piston 86 again cuts off flow through the inlet 90, whereupon further movement of the valve 59 is arrested.

The valve 59 will remain in this newly adjusted position so long as the aircraft remains under substantially the same atmospheric pressure conditions as correspond to the adjusted position of the valve. If, however, the aircraft, either later or during an interval of adjustment above mentioned, has passed to an altitude where a more rarefied atmosphere exists, with consequent re-expansion of the bellows 99, movements will have been initiated through the lever connections P and 92 and the rod 89 which will continue until the pistons 86 and 88 have moved to the right sufficiently to uncover the outlet conduit 91, thereby permitting fluid to pass from the space 87. When this condition is established, the spring 74 will tend to expand and cause the piston 82 to expel fluid from the chamber 83, at the same time moving the valve 59 to the right toward closing position. Unless the rate of climb is very rapid, however, this valve closing movement will soon be arrested because of the action of the linkage between the lower end of the lever 75 and the upper end of the lever 92 which tends to move the rod 89 back to the left as the piston 82 advances to the left until the piston 88 closes the outlet conduit 91.

It is obvious that many other mechanisms may be employed to accomplish the desired regulation of flow of compressed air to the rear discharge nozzle without departing from the spirit or scope of my invention. For example, any fluid under pressure may be used to actuate the lever 75, and not necessarily the oil under pressure from the motor as shown in Fig. 7. These and other variations in details may be made without departing from the invention.

It will further be understood that while Fig. 5 shows the rear nozzle or propulsive unit provided with a pressure-sensitive device for automatically regulating the supply of compressed air to this nozzle, the effect of such regulation and control of compressed air is to control and regulate the flow of compressed air from the compressor unit into the mixing chamber 19 and to this extent to control the supply of compressed air to the carburetor 20 of the power plant. Similarly, if the pressure-responsive device be applied in controlling the volume of compressed air discharged from the compressor to the mixing chamber 19 en route to the intake manifold of the power plant, it will substantially control and thereby regulate the flow of compressed air automatically into the rear propulsive nozzle 12.

There is shown in Fig. 8 an arrangement of pressure-responsive means for controlling the flow of compressed air from the branch pipe 9 to the mixing chamber 19. The details of the servomotor are omitted, but it will be understood that they may take a similar form as the devices illustrated in Figs. 5 and 7 as applied in controlling flow of compressed air to the rear propulsive nozzle. In Fig. 8 the control of the flow is effected by moving the nozzle sleeve 17 relatively to the fixed valve member 15 within the outlet end of the pipe 9. As illustrated, the sleeve 17 is provided with a depending lug 77a carrying a pin 62 projecting into a slot 76a in the upper end of the lever 75, the latter being pivoted at 77 to a support 78a. Hence when the link 80 moves with the piston 82, under the impulsion of the spring 74, or a motive fluid pressing against the opposite side of the piston, the annular passage defined between the stationary valve member 15 and the sleeve 17 is varied in cross-sectional area.

In Figs. 4 and 6 there is disclosed still another modification of means for regulating the flow of compressed air from the compressor to the engine. As shown, flow of compressed air and of atmospheric air from an air intake, not shown, to the mixing chamber 102 of the induction pipe 101 is regulated by means of dampers 104 and 105 pivotally mounted at 106 and 107 on opposite sides of the outlet from a discharge nozzle 114 of the branch pipe 113 leading compressed air from a supercharger, not shown. The dampers 104 and 105 are moved about their pivots by means of cooperating gear wheels 113' and 114' mounted on the ends of the pivots 106 and 107 with one of the gear wheels, 114', in engagement with a rack bar 115a. It will be understood that the rack bar 115a is moved lengthwise either manually by the pilot or automatically under control of a servomotor or the like in response to variations in the atmospheric pressure to move the dampers toward one another to restrict the flow of compressed air, or away from one another to increase the flow of compressed air. When moved outwardly toward their extreme positions the dampers serve to restrict the flow of atmospheric air passing into the mixing chamber through laterally disposed outlets 117 and 118.

It will be understood that various changes in the details of the arrangements and parts of the complete system or individual operating units thereof may be made without departing from the invention, which is not to be deemed as limited otherwise than as indicated by the appended claims.

What I desire to claim and secure by Letters Patent is:

1. A device of the kind described which consists of an airplane engine, a pair of atmospheric air intake conduits directed and opening toward the forward portion of, and straddling said engine, an air compressor, a mixing chamber connecting said air compressor and conduits, and means establishing a linear flow of mixed compressed and atmospheric air in a path substantially parallel with the engine and communicating rearwardly therewith.

2. A device of the character described which consists of an airplane engine, an intake manifold thereon, a pair of elongated conduits directed and opening toward the forward propeller end of said engine and straddling the length of the engine, said conduits having inlet ports in advance of said intake manifold, an air compressor disposed distant from the openings of said conduits beyond said engine, a mixed air conveyor communicating with said intake manifold and extending in the same direction as said conduits, said conduits respectively connecting with said conveyor and with said air compressor, and a connection between said compressor and conveyor.

3. In combination with an airplane power plant, a pair of air conduits straddling the longitudinal axis of the power plant and opening forwardly to the atmosphere adjacent the forward end of said plant and at two distinct sides thereof, an induction pipe connecting with said power plant, one of said conduits connecting with said induction pipe, an air compressor, the other conduit connecting with said air compressor, and a connection between said air compressor and said induction pipe disposed coaxially of the latter.

4. In an aircraft power plant, the combination of an airplane engine, a carbureter, an induction pipe extending from said carbureter parallel to and adjacent the rear of said engine and having a rearward flaring terminal, an air compressor having a connection forming an injector axially aligning with and extending concentrically into the flaring end of said induction pipe, an atmospheric-air conducting pipe connected to said air compressor, and an atmospheric air conducting pipe connected into the flaring end of said induction pipe about the air compressor connection or injector.

5. In an aircraft, the combination with a nacelle and propeller spinner, of an airplane engine disposed longitudinally of said nacelle, a pair of elongated air conduits having air inlet ends disposed in spaced positions adjacent the base of said propeller spinner, an air compressor carried at the rear of the engine, an induction pipe communicating at its inner end with said engine, and communicating at an angle adjacent its outer end with one of said conduits, the other conduit communicating with said air compressor, and a nozzle in communication with said air compressor and extending concentrically in the form of an injector into the outer end of said induction pipe adjacent the point of communication therewith of said first-mentioned conduit, whereby mixing of compressed and of atmospheric air introduced through said first-mentioned conduit is brought about within said induction pipe.

6. In a device of the kind described, the combination of an airplane engine, a carbureter, an induction pipe communicating at one end with said carbureter, an air compressor operatively associated with said engine, a nozzle in communication with said air compressor and extending concentrically into the induction pipe toward said carbureter, means establishing communication between a source of atmospheric air and said induction pipe at a point in the length of said induction pipe adjacent said nozzle, means establishing communication between said source of atmospheric air and said air compressor, and manually controlled means for regulating the discharge of compressed air through said nozzle into said induction pipe.

7. In a device of the kind described, the combination of an airplane power plant, a source of atmospheric air conveyance having inlet ports in advance of the power plant and outlet ports rearwardly thereof, an induction pipe for said power plant communicating at an angle with an outlet port of said atmospheric air source, an air compressor also communicating with an outlet port of said atmospheric air source, a nozzle in communication with said air compressor and forming an injector projecting concentrically into said induction pipe at the angular connection thereon, valve means disposed at said angular connection and associated with said nozzle for varying the supply of compressed air passing through said nozzle into said induction pipe, and means for manually actuating said valve means.

8. In an aircraft, in combination with an airplane power plant, a rear propulsion nozzle extending substantially in line therewith, an air induction pipe leading into said nozzle, a second air induction pipe leading into said engine, means including a compressed air source and a delivery pipe with two branches for injecting compressed air simultaneously into both induction pipes, means including an air supply pipe open at one end and at the other connected to said second pipe for injecting atmospheric air to mix with said compressed air, and distinct means for regulating the discharge of air through both induction pipes.

9. In an aircraft, a nacelle, an airplane engine carried by said nacelle, a jet-propulsion nozzle associated with said nacelle remotely from said engine, a pair of elongated conduits disposed symmetrically within said nacelle in peripheral juxtaposition thereto and in communication with the atmosphere adjacent the forward end of said nacelle so as to suck in atmospheric air adjacent the forward end of the nacelle and conduct it rearwardly of the engine, and an air compressor having one connection for feeding said jet nozzle and a second connection terminating in an injector for feeding said engine, one of said conduits having a portion adjacent to said injector communicating with the line of flow of compressed air into said engine, the other conduit communicating with the intake of said air compressor proper.

10. In an aircraft, an airplane type of internal combustion engine, a propulsive unit controlled thereby, an auxiliary propulsive unit, a constantly pumping air compressor interposed between said engine and said auxiliary propulsive unit and driven by said engine, means for feeding compressed air from said compressor to said engine, means for varying at will the supply of compressed air to said engine from said compressor, and means for simultaneously supplying a direct line of flow of compressed air from said compressor to said auxiliary propulsive unit while supplying compressed air from said compressor to the engine.

11. In a device of the kind described, the combination of a nacelle for an airplane terminating in a jet propulsion nozzle, having a rearwardly flaring bore, an airplane engine, an air conduit projecting in spaced manner into the flaring bore concentrically, an adjustable air regulator carried by said conduit within said nozzle, and an engine driven source of compressed air having a pipe supplying compressed air to said engine and a simultaneous communication with said air conduit, said regulator operating to vary the quantity of compressed air delivered by said conduit into said nozzle.

12. In an aircraft, in combination, a nacelle having a propulsive nozzle discharging adjacent the rear of said nacelle, an internal combustion engine disposed within said nacelle, an air compressor driven by said engine for supplying compressed air to said engine and said nozzle, and means responsive to variations in the pressure of the atmospheric air surrounding said nacelle to vary the amount of compressed air supplied to said nozzle.

13. In an aircraft, in combination, a nacelle having a propulsive nozzle discharging adjacent the rear of said nacelle, a source of compressed fluid disposed within said nacelle, means defining a fluid mixing chamber within said nacelle adjacent and in advance of the discharge outlet of said nozzle, a conduit leading from said compressed fluid source to said mixing chamber, said nacelle having air inlet openings in the walls thereof in advance of and adjacent said mixing chamber, means defining passages for atmospheric air from said openings to said mixing chamber, and means responsive to variations in the pressure of the ambient atmosphere to vary the amount of compressed fluid passing from said source to said mixing chamber.

14. In an aircraft, in combination, a nacelle having a propulsive nozzle discharging adjacent the rear and rearwardly of said nacelle, a source of compressed fluid disposed within said nacelle, means defining a fluid mixing chamber within said nacelle adjacent and in advance of the discharge outlet of said nozzle, an injector nozzle injecting into said mixing chamber concentrically of and in alignment with said propulsive nozzle, a conduit connecting said compressed fluid source with said injector nozzle, means defining paths of flow of atmospheric air to said mixing chamber at an angle to the direction of flow of compressed fluid through said injector nozzle, and means responsive to variations in the pressure of the ambient air to vary the flow of compressed fluid through the injector nozzle inversely with the pressure of atmospheric air.

PIERRE ERNEST MERCIER.